Dec. 31, 1929.  S. S. VARKAS  1,741,964

AEROPLANE LANDING GEAR ARM

Filed April 9, 1929

INVENTOR.
Spiros S. Varkas
BY
ATTORNEY

Patented Dec. 31, 1929

1,741,964

UNITED STATES PATENT OFFICE

SPIROS S. VARKAS, OF NEW YORK, N. Y.

AEROPLANE LANDING-GEAR ARM

Application filed April 9, 1929. Serial No. 353,875.

This invention relates to new and useful improvements in aeroplanes.

The invention has for an object the provision of a device of the class mentioned which is of simple durable construction, dependable in use and efficient in action, and which may be manufactured and sold at a reasonable cost.

The invention proposes the use of a landing gear consisting of a bracket for attachment upon the bottom of an aeroplane and having forward projecting arms and wheels attached on the extremities of the arms so that the turning moment of the plane on the wheels is substantially rearwards while the plane is stationary and slightly rearwards while the plane is taking off or landing. The landing gear may be modified so that the position of the wheels relative to the brackets may be adjusted for adjusting the rearward turning moment of the plane, and also so that the position of the wheels to the bracket may be adjusted during flight for reducing the probability of nose spilling in emergencies.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Figure 1:
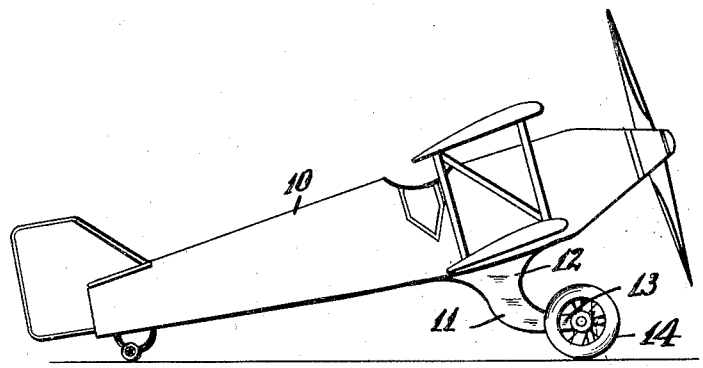
Fig. 1 is a side elevational view of an aeroplane provided with a landing gear constructed according to this invention.

The reference numeral 10 indicates generally an aeroplane or other flying machine customarily provided with a landing gear and numeral 11 indicates generally such a landing gear. This landing gear consists of a bracket 12 attached at its top on the bottom of the aeroplane and provided with forward projecting arms 13 supporting wheels 14. The bracket 12 should be attached on the plane so that the turning moment about the wheels 14 is slightly rearwards during landing and taking off.

Figure 2:
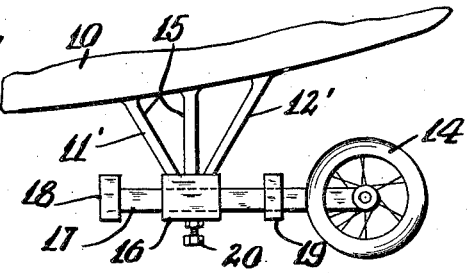
Fig. 2 is a fragmentary side elevational view of a plane provided with a landing gear constructed according to modified form.

In the modified form of the device illustrated in Fig. 2, the aeroplane 10 has been shown with a landing gear 11' which consists of a bracket 12' formed of a plurality of struts 15 attached at their top ends upon the bottom of the plane and at their bottom ends upon a bushing 16. A rod 17 is slidably arranged in the bushing and is provided at its rear end with a head 18 preventing complete disengagement from the bushing. A collar 19 is attached upon the rod 17 in front of the bushing 16 for limiting the slidable movement of the rod. Landing wheels 14 are connected on the front ends of the rods 17. A means is provided for fixing the rod 17 in various positions relative to the bushing 16 this means being generally indicated by a set screw 20 threadedly engaging the bushing and abutting against the rod. The pilot of the plane may loosen the set screw 20 and adjust the position of the rod 17 for adjusting the rearward turning moment of the plane about the wheels 14 to his particular taste.

Figure 3:
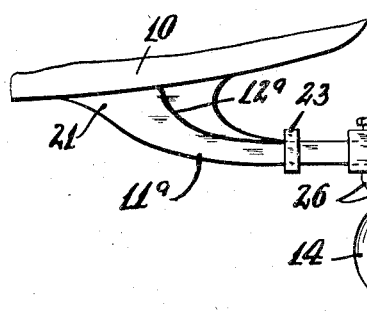
Fig. 3 is a view similar to Fig. 2 but disclosing another modification.

In the modified form of the device illustrated in Fig. 3, a landing gear 11ª has been shown attached to the bottom of the plane 10. This landing gear consists of a bracket 12ª and landing wheels 14. The bracket 12ª has an arm attached at one end as at 21 to the bottom of the plane and bent so as to provide a horizontal portion terminating at its other end. A head 22 is fixed on the free end of the rod and a collar 23 along the length of the rod. Between the head 22 and the collar 23, bushings 24 are slidably mounted on the rod and held in desired fixed positions by set screws 25. Struts 26 are connected at their top ends upon the bushing and at their bottom ends support the said wheels 14. This arrangement also permits the pilot to change the rearward moment of the plane about the wheels 14.

Figure 4:
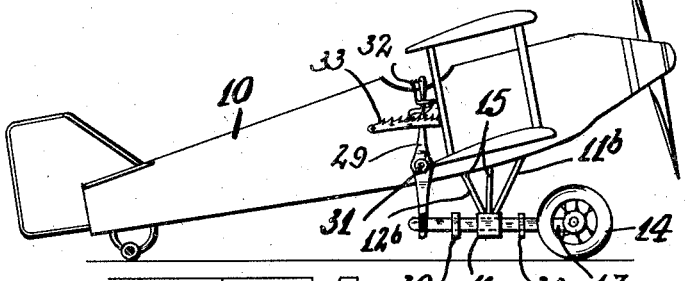
Fig. 4 is a view similar to Fig. 1 but disclosing another modified form of the invention.
Figure 5:
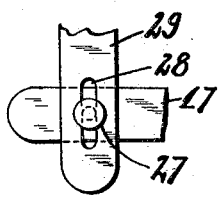
Figs. 5 and 6 are enlarged fragmentary detail views of portions of Fig. 4.
Figure 6:
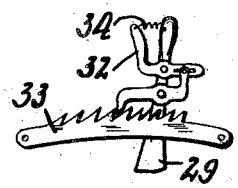

In the modified form of the device illustrated in Figs. 4, 5 and 6, the plane 10 is shown provided with a landing gear 11ᵇ consisting of bracket 12ᵇ and landing wheels 14. The bracket 12ᵇ has a plurality of struts 15 connected at their top ends to the bottom of the plane and supporting a bushing 16. A rod 17 is slidably mounted in the bushing and at its front ends supports the wheels 14 and at its rear ends is provided with a pin 27 engaging in an elongated slot 28 in the bottom of a lever 29. Collars 30 are fixed upon the rod 17 on opposite sides of the bushing 16 and limit the movement of the rod. The lever 29 is pivoted as at 31 upon the body of the plane and extends within reach of the pilot of the plane. At its free end it is provided with a catch 32 arranged for engaging the teeth of an arcuate tooth member 33 also fixed upon the body of the plane so that the lever may assume various fixed positions. A spring 34 is arranged for normally urging the catch in operative position.

The pilot of the plane during flight may manually grasp and operate the catch 32 for disengaging it from the arcuate member 33 and is then free to move the lever 29 and change the turning moment of the plane upon the wheels. This is of particular advantage in an emergency when the pilot is forced to land from low elevations and in his opinion after striking the ground the probability of a nose spill is great, an increase in the rearward turning moment of the plane in such an instant would be very helpful.

It is to be understood that the use of large size landing wheels 14 is preferred, although the size of the wheel may be selected so as to satisfy any particular condition.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A landing gear for an aeroplane, comprising a bracket and landing wheels, the bracket consisting of struts connected with bushings slidably supporting rods, and said wheels being mounted on the front of the rods.

2. A landing gear for an aeroplane, comprising a bracket and landing wheels, the bracket consisting of struts connected with bushings slidably supporting rods, and said wheels being mounted on the front of the rods, said rods having protuberances on opposite sides of the bushings for limiting their movements.

3. A landing gear for an aeroplane, comprising a bracket and landing wheels, the bracket consisting of struts connected with bushings slidably supporting rods, and said wheels being mounted on the front of the rods, said rods having protuberances on opposite sides of the bushings for limiting their movements, and the bushings being provided with set screws for clamping the rods in fixed positions.

4. In combination with an aeroplane, a bracket attached on the bottom thereof, and provided with bushings, rods slidable in the bushings, landing wheels on the front ends of the rods, and means for adjusting the positions of the rods from the pilot's seat for changing the turning moment of the plane about the wheels.

5. In combination with an aeroplane, a bracket attached on the bottom thereof, and provided with bushings, rods slidable in the bushings, landing wheels on said rods, and means for adjusting the positions of the rods from the pilot's seat for changing the turning moment of the plane about the wheels, comprising pivoted levers connected with said rods, and means for holding said levers in various angular positions.

6. In combination with an aeroplane, a bracket attached on the bottom thereof, and provided with bushings, rods slidable in the bushings, landing wheels on said rods, and means for adjusting the positions of the rods from the pilot's seat for changing the turning moment of the plane about the wheels, comprising levers connected with said rods, and extending within reach of the pilot of the plane, and means for holding said levers in various adjusted positions.

In testimony whereof I have affixed my signature.

SPIROS S. VARKAS.